United States Patent
Rahman et al.

(10) Patent No.: US 7,618,298 B2
(45) Date of Patent: *Nov. 17, 2009

(54) ELECTRICAL CONNECTOR FOR FUEL PUMP

(75) Inventors: Sheikh Habibur Rahman, Macomb, MI (US); Max Albert Gatsche, Flat Rock, MI (US); Daniel James Jilg, Novi, MI (US)

(73) Assignee: FCI Americas Technology, Inc., Carson City, NV (US)

( * ) Notice: Subject to any disclaimer, the term of this patent is extended or adjusted under 35 U.S.C. 154(b) by 0 days.

This patent is subject to a terminal disclaimer.

(21) Appl. No.: 12/287,625

(22) Filed: Oct. 9, 2008

(65) Prior Publication Data

US 2009/0088031 A1 Apr. 2, 2009

Related U.S. Application Data

(63) Continuation of application No. 11/906,404, filed on Oct. 1, 2007, now Pat. No. 7,452,247.

(51) Int. Cl.
*H01R 13/405* (2006.01)
(52) U.S. Cl. .................. 439/736; 264/272.11
(58) Field of Classification Search .......... 439/722, 439/606, 736; 264/272.11, 250
See application file for complete search history.

(56) References Cited

U.S. PATENT DOCUMENTS

| | | | |
|---|---|---|---|
| 2,583,026 A | 1/1952 | Swift | 174/117 R |
| 4,198,465 A | 4/1980 | Moore et al. | 264/1.1 |
| 4,398,785 A | 8/1983 | Hedrick | 439/736 |
| 4,589,721 A | 5/1986 | Sedig et al. | 339/210 R |
| 4,822,434 A | 4/1989 | Sawaki et al. | 156/48 |
| 4,921,437 A | 5/1990 | Cooper et al. | 439/275 |
| 5,527,502 A | 6/1996 | Kiuchi et al. | 264/250 |
| 5,567,375 A | 10/1996 | Filion et al. | 264/266 |
| 5,855,834 A | 1/1999 | Ysbrand | 264/277 |
| 6,102,739 A | 8/2000 | Murakami | 439/587 |
| 6,152,761 A | 11/2000 | Wellinsky et al. | 439/736 |
| 6,187,242 B1 | 2/2001 | Onoda | 264/255 |
| 6,254,820 B1 | 7/2001 | Cornell | 264/274 |
| 6,257,920 B1 | 7/2001 | Finona et al. | 439/455 |
| 6,287,502 B1 | 9/2001 | Onoda | 264/263 |
| 6,365,085 B2 | 4/2002 | Takahashi | 264/261 |
| 6,375,512 B1 | 4/2002 | Zito et al. | 439/736 |
| 6,503,436 B1 | 1/2003 | Koguchi et al. | 264/277 |
| 6,506,083 B1 | 1/2003 | Bickford et al. | 439/36 |
| 6,645,006 B1 | 11/2003 | Crisanti et al. | 439/564 |
| 6,780,067 B1 | 8/2004 | Kono et al. | 439/736 |

(Continued)

FOREIGN PATENT DOCUMENTS

JP 2005019321 A 1/2005

*Primary Examiner*—Tho D Ta
(74) *Attorney, Agent, or Firm*—Harrington & Smith PC

(57) ABSTRACT

An electrical connector including a plurality of electrical contacts; and a housing. The housing includes a pre-mold housing member which has been overmolded onto the electrical contacts; and an overmold housing member which has been overmolded onto the electrical contacts and the pre-mold housing member. The pre-mold housing member comprises an exterior sealing surface which is not covered by the overmold housing member. The exterior sealing surface of the pre-mold housing member loops around an exterior lateral side of the housing which is between front and rear ends of the housing.

21 Claims, 7 Drawing Sheets

U.S. PATENT DOCUMENTS

| | | | |
|---|---|---|---|
| 6,783,396 B1 | 8/2004 | Osterhart et al. | 439/587 |
| 6,821,162 B2 | 11/2004 | Mott et al. | 439/722 |
| 6,913,493 B2 | 7/2005 | Berg et al. | 439/736 |
| 6,932,657 B2 | 8/2005 | Mizutani | 439/736 |
| 6,966,800 B2 | 11/2005 | Mott | 439/722 |
| 7,235,205 B2 | 6/2007 | Mott et al. | 264/255 |
| 7,452,247 B1 * | 11/2008 | Rahman et al. | 439/736 |
| 2005/0058549 A1 | 3/2005 | York et al. | 417/44.2 |
| 2006/0292913 A1 | 12/2006 | Milton | 439/271 |

* cited by examiner

ELECTRICAL CONNECTOR FOR FUEL PUMP

CROSS REFERENCE TO RELATED APPLICATION

This is a continuation patent application of U.S. patent application Ser. No. 11/906,404 filed Oct. 1, 2007, now U.S. Pat. No. 7,452,247, which is hereby incorporated by reference in its entirety.

BACKGROUND OF THE INVENTION

1. Field of the Invention

The invention relates to an electrical connector and, more particularly, to an electrical connector having overmolded housing members.

2. Brief Description of Prior Developments

U.S. Pat. No. 6,821,162 B2 discloses an integrated seal flange electrical connector which comprises a pre-mold housing which is overmolded onto electrical contacts, and an overmolded housing which is overmolded onto the pre-mold housing and the contacts. This is used to establish a tortuous path to prevent fuel vapor from passing though the connector.

There is a desire to provide an electrical connector which can be used with a fuel system and sealed with an O-ring seal which does not have parting line in molded plastic members (caused from the mold process) and which has a tortuous path through the connector to prevent fuel vapor from passing through the connector.

SUMMARY OF THE INVENTION

In accordance with one aspect of the invention, an electrical connector is provided including a plurality of electrical contacts; and a housing. The housing includes a pre-mold housing member which has been overmolded onto the electrical contacts; and an overmold housing member which has been overmolded onto the electrical contacts and the pre-mold housing member. The pre-mold housing member comprises an exterior sealing surface which is not covered by the overmold housing member. The exterior sealing surface of the pre-mold housing member loops around an exterior lateral side of the housing which is between front and rear ends of the housing.

In accordance with another aspect of the invention, a fuel system electrical connector is provided comprising a plurality of electrical contacts and a housing. The electrical contacts each having a first end, an opposite second end and a bent section between the first and second ends. The first end comprises a female connection area. The housing comprises a pre-mold housing member and an overmold housing member. The pre-mold housing member is overmolded onto the electrical contacts, wherein portions of the pre-mold housing member form separate tubes surrounding each of the female connection areas. The overmold housing member has been overmolded onto the bent sections of the electrical contacts and onto the pre-mold housing member. The overmold housing member at least partially forms a front end and a rear end of the housing. The pre-mold housing member comprises an exterior sealing surface which is not covered by the overmold housing member. The exterior sealing surface of the pre-mold housing member loops around an outer lateral side of the housing located between front and rear outer lateral sides of the housing formed by the overmold housing member. Areas of contact between the overmold housing member, the electrical contacts and the pre-mold housing member form tortuous paths between the front and rear ends of the housing to prevent flow of fuel vapor along the paths through the connector between the front and rear ends of the housing.

In accordance with another aspect of the invention, a method of manufacturing an electrical connector is provided comprising overmolding a first housing member onto the electrical contacts; and overmolding a second housing member onto the electrical contacts and the first housing member. The first housing member comprises an exterior sealing surface which is not covered by the second housing member. The exterior sealing surface of the first housing member loops around an exterior lateral side of the housing between front and rear exterior lateral sides of the second housing member.

BRIEF DESCRIPTION OF THE DRAWINGS

The foregoing aspects and other features of the invention are explained in the following description, taken in connection with the accompanying drawings, wherein.

DETAILED DESCRIPTION OF THE PREFERRED EMBODIMENT

Figure 1:
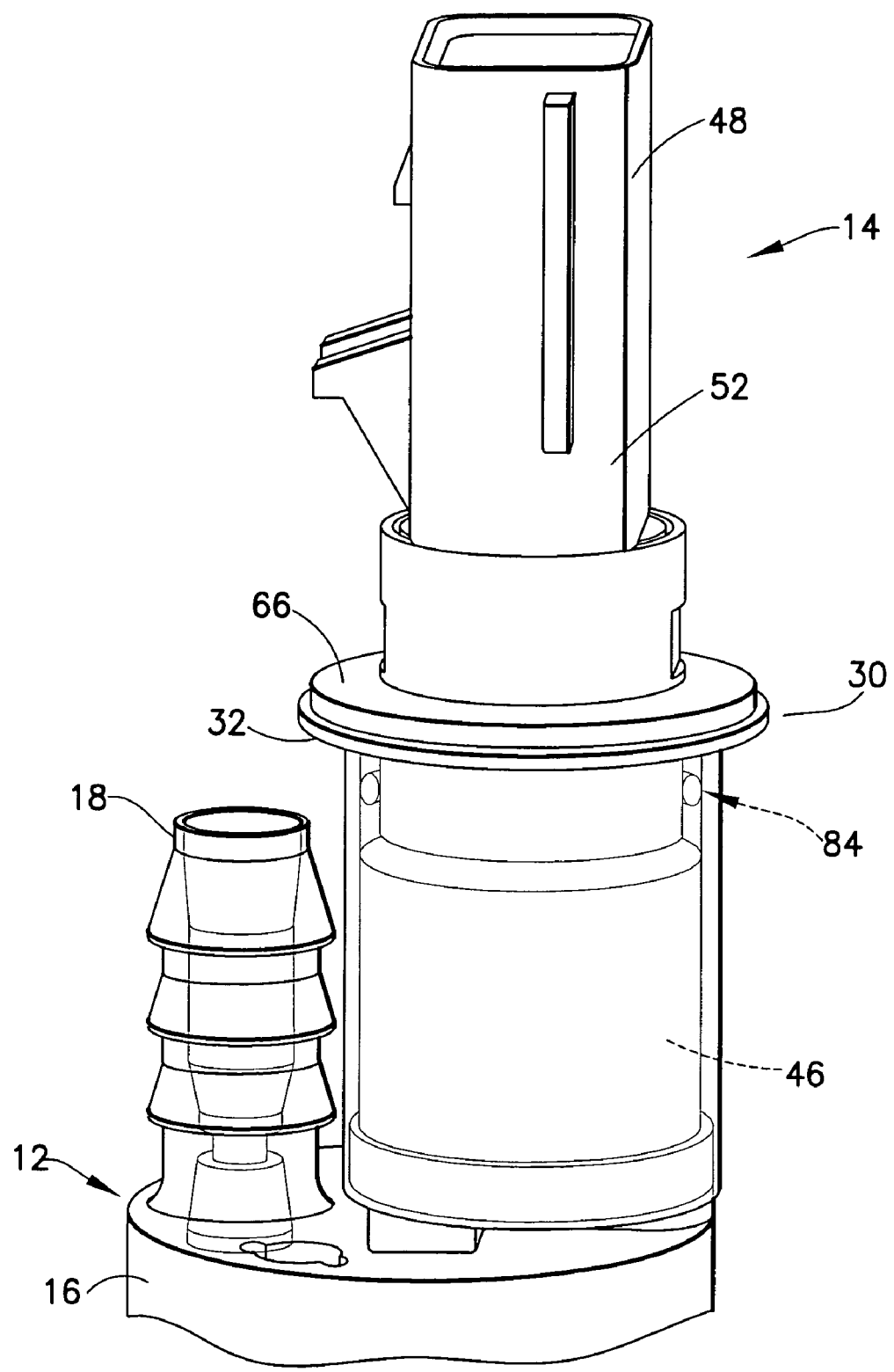
FIG. 1 is a partial perspective view of an assembly incorporating features of the invention, with some components shown in phantom.

Referring to FIG. 1, there is shown a perspective view of a portion of a fuel system assembly 10 incorporating features of the invention. Although the invention will be described with reference to the exemplary embodiment shown in the drawings, it should be understood that the invention can be embodied in many alternate forms of embodiments. In addition, any suitable size, shape or type of elements or materials could be used.

Figure 2:
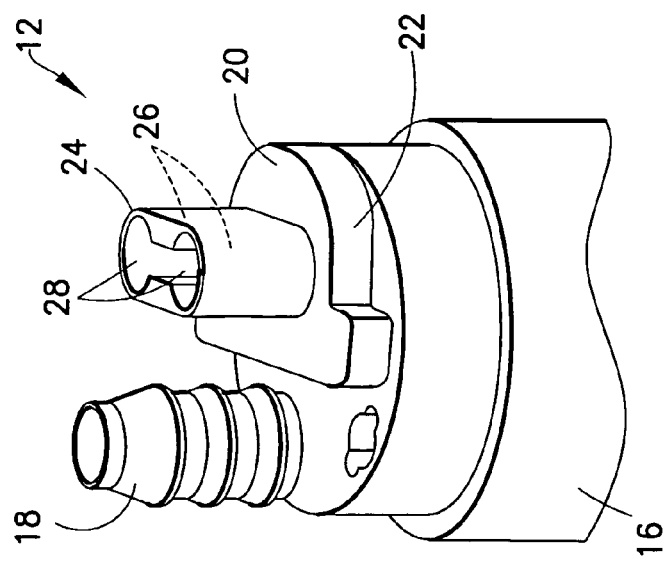
FIG. 2 is a perspective view of the portion of the fuel pump shown in FIG. 1.
Figure 5:
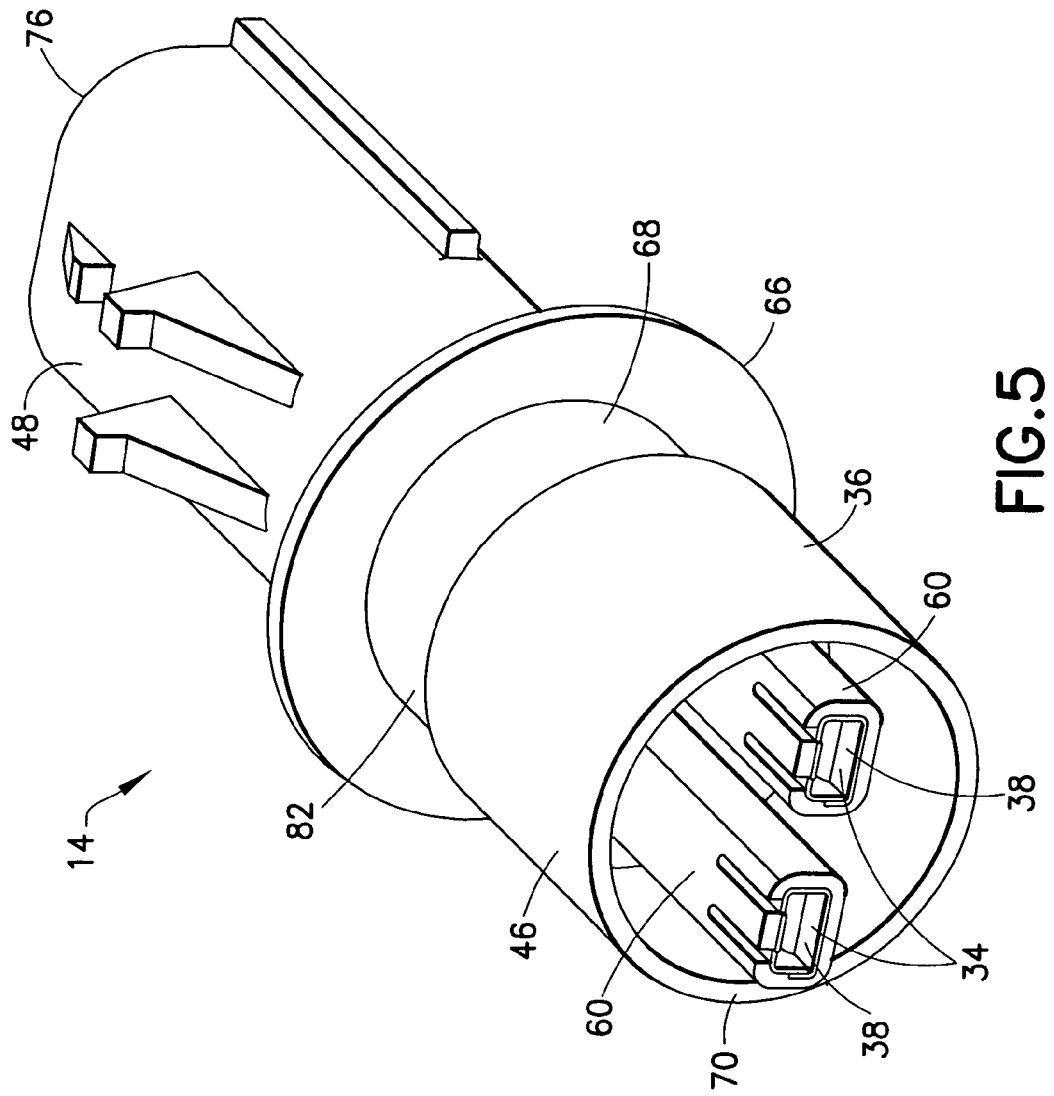
FIG. 5 is a front end perspective view of the interface electrical connector shown in FIGS. 1 and 4.
Figure 6:
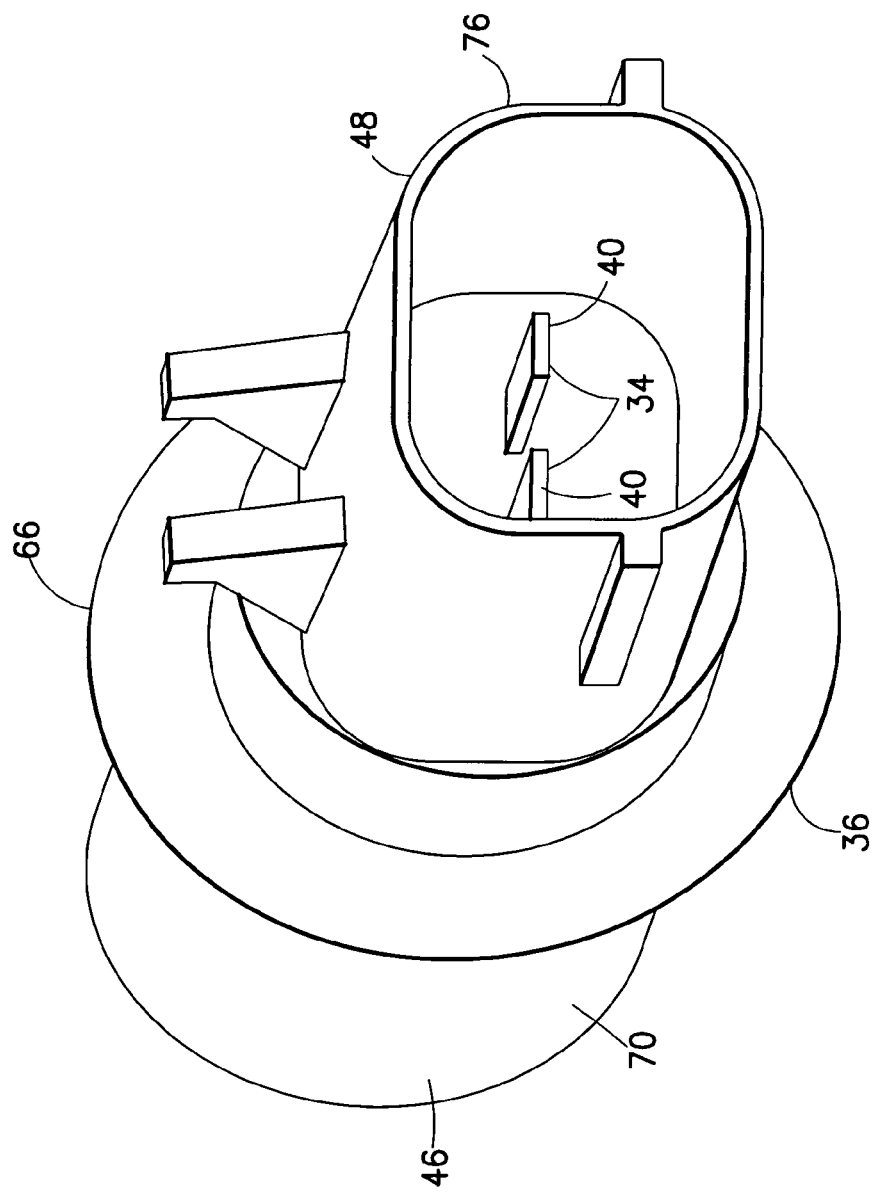
FIG. 6 is a front end perspective view of the interface electrical connector shown in FIG. 5 from and opposite end.
Figure 7:
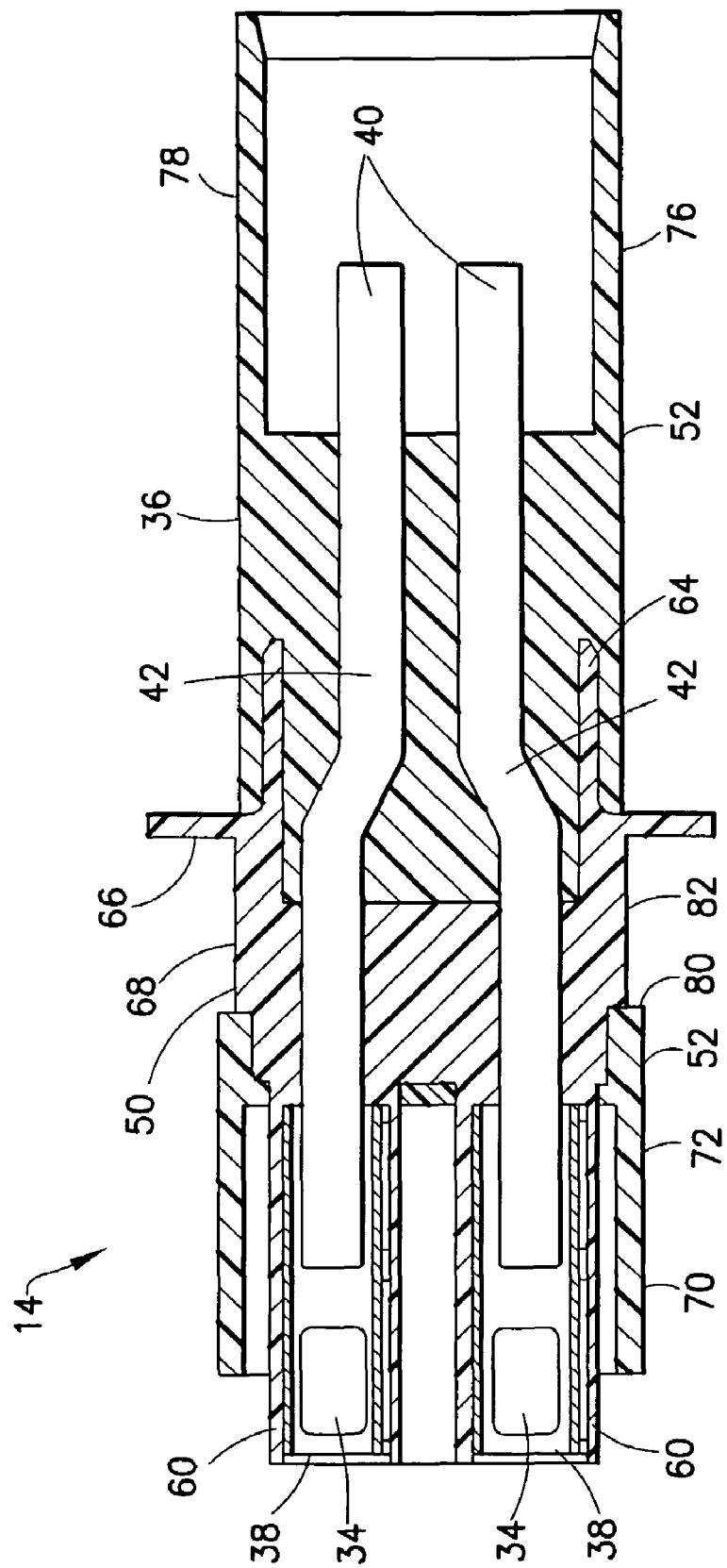
FIG. 7 is a cross sectional view of the interface electrical connector shown in FIGS. 4-6.
Figure 8:
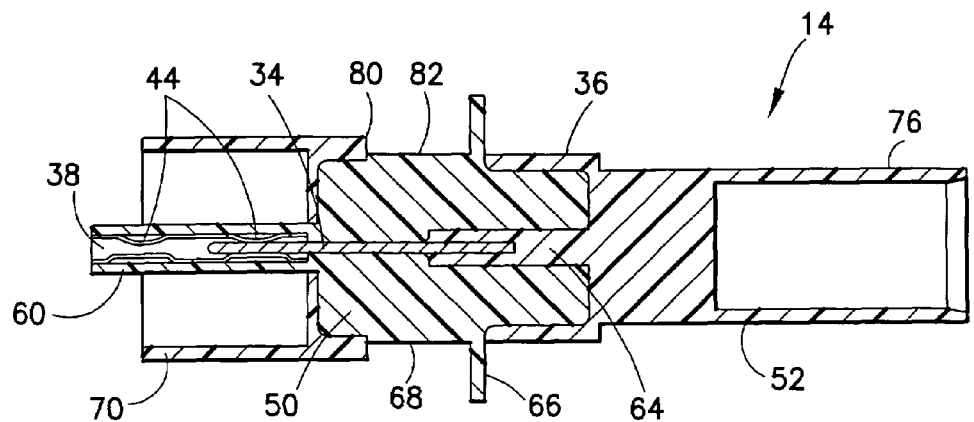
FIGS. 8-10 are additional cross sectional views of the interface electrical connector shown in FIGS. 4-7.
Figure 9:
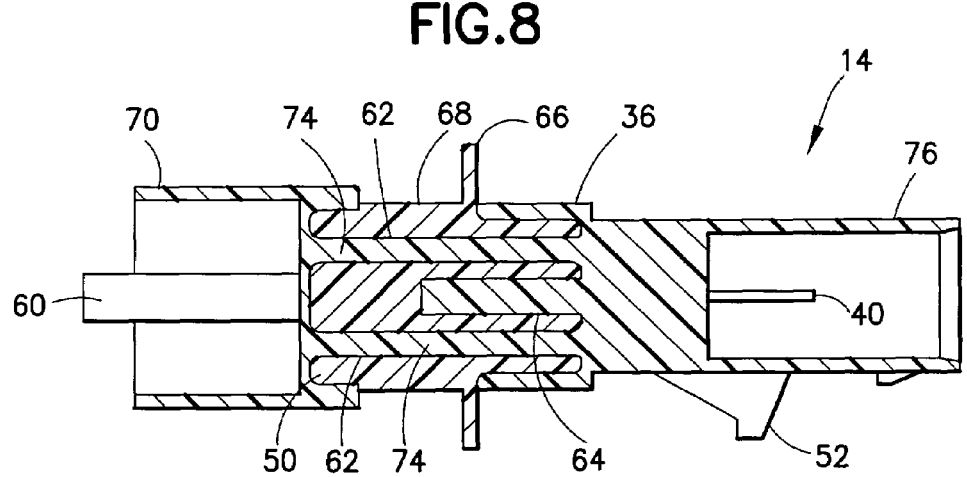
Figure 10:
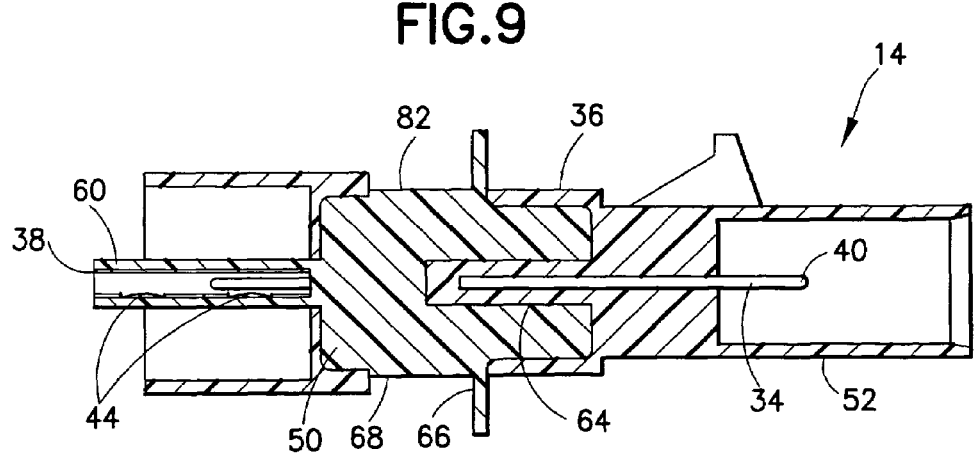

The assembly 10 is intended for use in a vehicle, such as an automobile, for supplying fuel to the engine of the vehicle. However, in alternate embodiments, the assembly 10 could be used in any suitable type of apparatus. The assembly 10 generally comprises a fuel pump 12 and an interface electrical connector 14. Referring also to FIG. 2, the fuel pump 12 comprises a housing 16 forming a fuel outlet 18 and an electrical connector mount 20. The fuel outlet 18 is adapted to have a fuel hose (not shown) mounted thereon. The electrical connector mount 20 comprises a can connection area 22 and an electrical connector section 24 having electrical contacts 26 in receiving areas 28. However, in alternate embodiments, any suitable fuel pump could be provided. The electrical contacts 26 are connected to an electric motor of the fuel pump. The electrical connector section 24 is sized and shaped to removably receive a portion of the interface electrical connector 14. The connector 14 can be held in place by pressure. The connector 14 can be disconnected from the pump 12 if the pump needs to be service or replaced. The connector 14 and connector section 24 also allow for faster assembly of the vehicle during manufacture.

Figure 3:
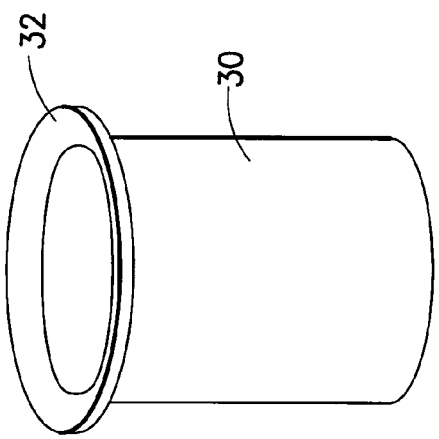
FIG. 3 is a perspective view of the can of the assembly shown in FIG. 1.

Referring also to FIG. 3, a fuel pump sealing can 30 is provided as part of the connection of the interface electrical connector 14 to the pump 12. The can 30 is preferably comprised of metal. The can 30 has a general tube shape with open top and bottom ends. A top end of the can 30 has an outwardly projecting annular flange 32. A bottom end of the can 30 is fixedly mounted on the can connection area such as by welding or epoxy for example. The can 30 forms a receiving area, through its open top side, for receiving a first end of the interface connector 14 and stably securing it with the pump. The first end of the connector 14 preferably makes a very close fit with the inside diameter of the can 30 along a majority of the height of the can.

Figure 4:
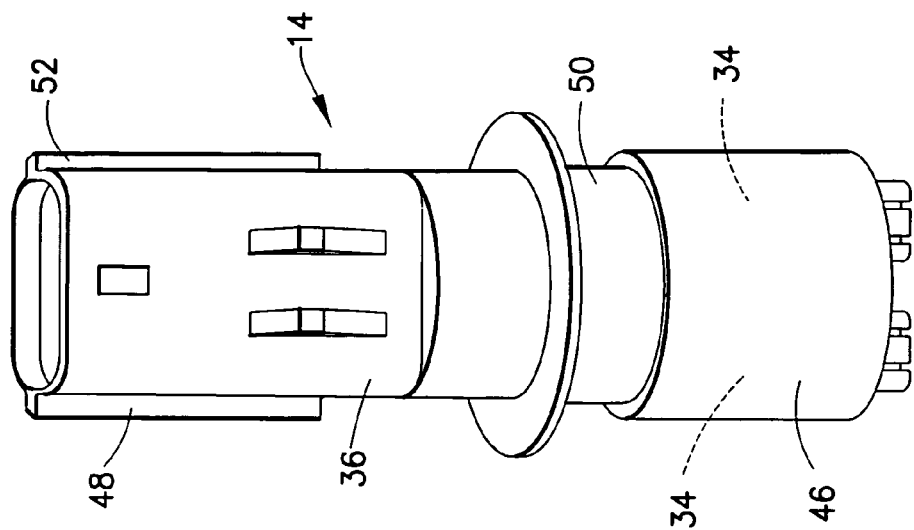
FIG. 4 is a perspective view of the interface electrical connector of the assembly shown in FIG. 1.

Referring also to FIG. 4, the interface electrical connector 14 forms an interface for connecting a mating electrical connector (not shown) to the fuel pump 12. The connector 14 comprises a first section 46 which forms a fuel pump interface section and an opposite second section 48 which forms the mating electrical connector interface. The interface connector 14 forms part of a sealing system with the pump 12 to prevent fuel vapor or gases from exiting the assembly 10 through the receiving areas 28. Without a sealing system, fuel vapor or gases from inside the pump housing 16 could escape at the junction of the contacts 26 with the housing 16 and exit the assembly 10.

Referring also to FIGS. 5-10, the interface connector 14 generally comprises electrical contacts 34 and a housing 36. The electrical contacts 34 each generally comprise a first end 38, and opposite second end 40 and a bent section 42 between the first and second ends. The first end 38 comprises a female connection area or cage adapted to receive the contacts 26 of the pump. The female connection area preferably has spring contact sections 44 (see FIGS. 8 and 10) for contacting the contacts 26. However, in alternate embodiments, the first end 38 could have any suitable size and shape for mating with the contacts 26.

The second end 40 of each contact 34 has a male contact or blade shape. The second end 40 is adapted to removably mate with contacts in the mating electrical connector (not shown). However, in alternate embodiments, any suitable type of second end of the contacts 34 could be provided.

The bent section 42 of each contact 34 creates an offset between the first and second ends 38, 40. The contact 34 could be stamped from flat sheet metal, so the bent section 42 could merely be formed during the stamping process. The front end 38 is preferably formed by stamping and folding portions of the flat sheet metal to form the female cages with the spring contact sections 44. However, in alternate embodiments each contact could be comprised of multiple pieces.

Figure 11:
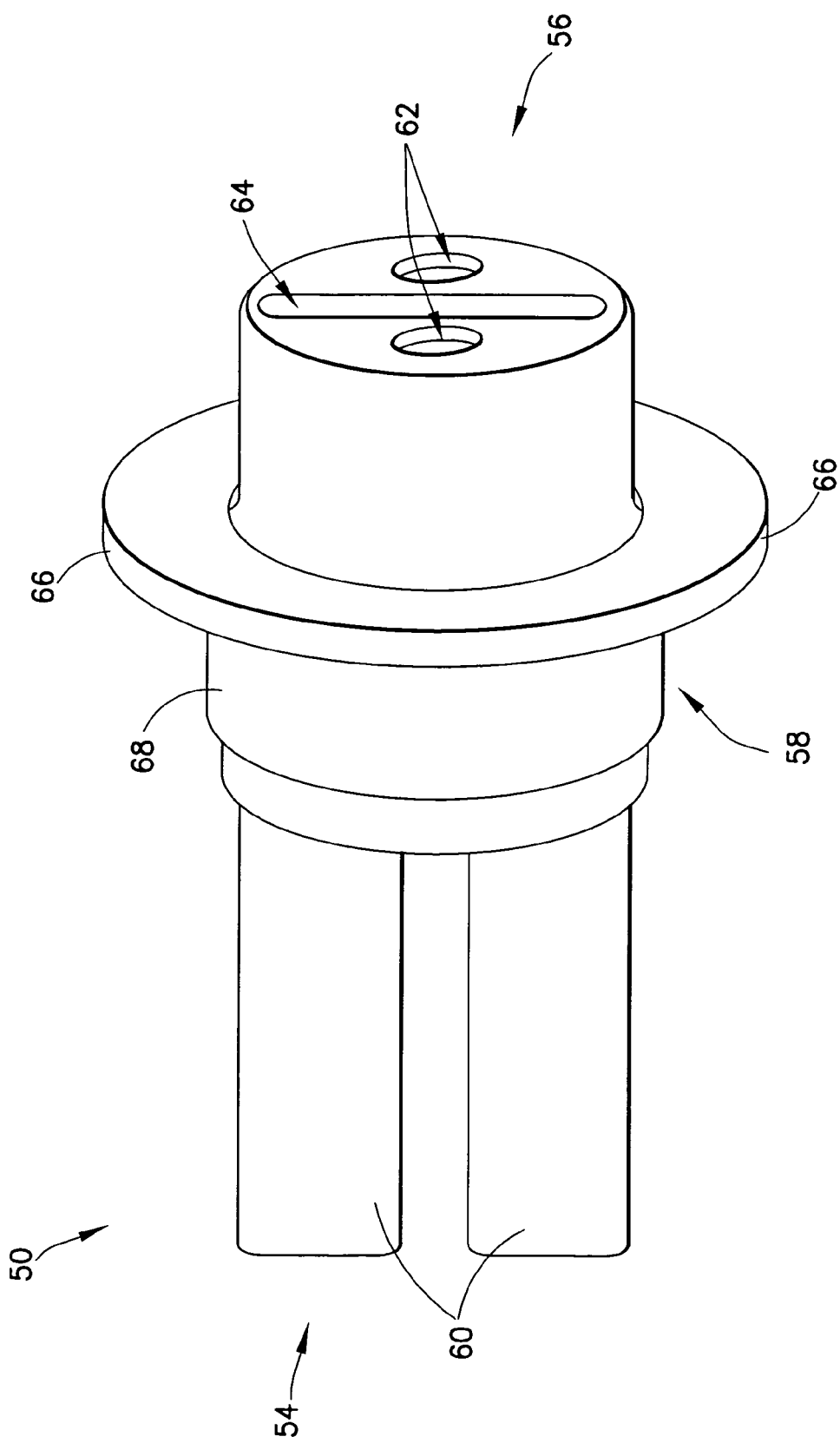
FIG. 11 is a perspective view of the pre-mold housing member shown in FIG. 7-10, but without showing the electrical contacts.

The housing 36 is preferably made of molded plastic or polymer material. The housing 36, in the embodiment shown, has two housing members; a pre-mold housing member 50 and an overmold housing member 52. However, in alternate embodiments the housing could comprise more than two housing members. The pre-mold housing member 50 is overmolded onto the contacts 34 such as by an insert molding process such that no mold parting seams are formed around the lateral side perimeter of the member. FIG. 11 shows a perspective view of the pre-mold housing member 50, but without showing the contacts 34. The pre-mold housing member 50 comprises a first end 54, and opposite second end 56, and a middle section 58 between the first and second ends.

The first end 54 comprises two separate, parallel tubes 60. The second end 56 has two through holes 62 and a rear aperture 64 which extend into the middle section 58. The middle section 58 has an annular, outwardly projecting flange 66 and an annular smooth exterior surface 68 in front of the flange 66. The surface 68 and the flange 66 loop around the outer lateral side of the housing 36. The flange 66 is adapted to mate with the flange 32 of the can 30. The two flanges 32, 66 can perhaps be permanently mated to each other such as with adhesive or epoxy for example. In alternate embodiments, the pre-mold housing could have any suitable shape.

During manufacture of the interface connector 14 the contacts 34 are formed and placed in a mold, such as for insert molding. The pre-mold housing member 50 is then overmolded onto the contacts 34. More specifically, as shown in the drawings, the middle section 58 is overmolded onto middle sections of the contacts 34, but spaced from the bent sections 42. The bent sections 42 end up located in the rear end aperture 64 with the second ends 40 of the contacts 34 extending rearward out of the aperture 64. As seen best in FIGS. 5, 7, 8 and 10, the tubes 60 are formed onto the first ends 38 of the contacts 34 around the female connection sections. However, the tubes 60 do not interfere with movement of the spring contact sections 44 or the open aperture into the interior of the female connection sections.

After the subassembly of the contacts 34 and pre-mold housing member 50 is formed, the overmold housing member 52 is then overmolded onto the subassembly. As seen in the figures, the overmold housing member 52 is molded onto both the contacts 34 and the pre-mold housing member 50. A front section 70 of the overmold housing member 52 is molded onto the exterior of the pre-mold housing member 50 at the first end 54 to form an annular ring or front tube section 72 surrounding and spaced from the tubes 60. In this embodiment the tubes 60 and first ends 38 of the contacts 34 extend outward past the end of the annular ring.

A middle section 74 of the overmold housing member 52 is only located in the through holes 62 of the pre-mold housing member 50. As seen best in FIG. 7, the front section 70 of the overmold housing member 52 forms a ledge 80 at the junction of the front section 70 with the surface 68. Thus, an annular recessed area 82 is formed between the ledge 80 and the flange 66 at the surface 68. This recessed area 82 is adapted to receive an O-ring seal 84 (see FIG. 1) for sealing the housing 36 with the can 30. In an alternate embodiment a seal other than an O-ring could be provide. The seal 84 is mounted in the recessed area 82 and then the connector 14 is inserted into the can 30 on the pump 12. The seal 84 merely seals between the pre-mold housing member 50 (at the surface 68) and the can 30. The overmold housing member 52 is not part of that seal. The surface 68 and the flange 66 are located between front and rear outer lateral sides of the housing 36 formed by the overmold housing member 52.

The rear section 76 of the overmold housing member 52 is overmolded onto the contacts 34 at the bent sections 42 in the aperture 64 and outward, but leaves the distal second ends 40 of the contacts exposed. The rear section 76 forms an annular ring 78 surrounding the exposed second ends 40. The rear section 76 is molded on the exterior of the second end 56 of the pre-mold housing member 50, but only from the base of the flange 66 rearward. Thus, the flange 66 of the pre-mold housing member 50 is not covered by the overmold housing member 52, and the surface 68 is not covered by the overmold housing member.

The two housing members 50, 52 could be comprised of different materials. Because of the bent sections 42 of the contacts 34, and because of the two sequentially formed overmolded housing members 50, 52, the path of each of the contacts 34 through the housing 36 has a tortuous path. Plastic of the overmold housing member 52 flows around the male blade contact design at the second end 40 of the contacts to create the tortuous path. This tortuous path helps to prevent fuel vapor or gases from passing through the connector 14 along the paths of the contacts 34 and out of the assembly 10. The pre-mold housing member 50 is captured in the overmold housing member 52 between the front and rear sections 70, 76. The internal channels 62, 64 allow the material of the overmold housing member 52 to flow during molding.

One of the features of the invention is the fact that the O-ring seal 84 can make a sealing contact by being compressed between the smooth interior of the can 30 and the smooth exterior surface 68 of the pre-mold housing member 50. The feature of the pre-mold housing member 50 being formed without parting lines at the surface 68 makes this possible. Otherwise, parting lines at the surface 68 would allow miniature gaps between the seal 84 and the surface 68 to allow fuel vapor or gases to pass through the seal. The middle section of the overmold housing member 52, being located inside the pre-mold housing member 50, also makes contact of the seal 84 with only the pre-mold housing member 50 possible. When the connector 14 is plugged into the can 30 and the electrical connector section 24, the front ends of the tubes 60 and the front ends of the contacts 34 intend into the receiving areas 28. The contact 26 are inserted into the cages of the first end 38 of the contacts 34. The combination of the elements of the connector 14 and their forming and arrangement relative to each other help to prevent fuel vapor or gases to exit through the assembly at the connector 14.

The present invention can be used with a fuel pump connector header. The header can provide an electrical interface between the fuel pump and the electronic control module of an automobile. A fuel pump connector header can maintain the electrical connection between the fuel pump and the electrical control module. The fuel pump connector header can have two parts. One end can connect to the electrical mating connector; called the connector interface side. The other end can connect to the pressurized fuel side; called the fuel header housing. The connector interface side is exposed to the outside environment and the fuel header side is submerged in the pressurized fuel. The header housing goes through a metal can where it has to maintain its sealing capability under the fuel pressure.

One or two rubber o-rings are assembled over the round plastic header housing. The outside of the o-ring(s) rest against the metal can. In order to maintain the sealing capability of the fuel header housing under pressure, the plastic surface must be free from mold parting lines, mold construction lines, mold flash or any other molding imperfections. This section of the fuel header is created by a pre-mold and then the pre-mold is over-molded to create the full housing. New plastic is added to both ends of the pre-mold during the over-molding. To achieve that, the part has be designed in such a way that the mold runner system has to allow new material to flow from one end to the other through the inside channels of the pre-mold created during the pre-mold. To create the sealing between the metal electrical contact and the plastic it is embedded in, the contact has been designed in a special way. The contacts can be designed with multiple grooves all the way around the contacts and new plastic has to flows around the contacts during the over-molding to create the torturous path. This pre-mold concept is the unique way to create sealing surface on the outside and allow new plastic to flow through the inside to form the final product.

It should be understood that the foregoing description is only illustrative of the invention. Various alternatives and modifications can be devised by those skilled in the art without departing from the invention. For example, features recited in the various dependent claims could be combined with each other in any suitable combination(s). Accordingly, the invention is intended to embrace all such alternatives, modifications and variances which fall within the scope of the appended claims.

What is claimed is:

1. A device comprising:
    at least one electrical contact; and
    a housing sub-assembly having the electrical contact connected thereto, wherein the housing sub-assembly comprises:
        a one-piece pre-mold housing member which has been overmolded onto the electrical contact; and
        a one-piece overmold housing member which has been overmolded onto the electrical contact and onto the pre-mold housing member, wherein the overmold housing member is located at opposite ends of the pre-mold housing member,
        wherein the pre-mold housing member comprises an exterior sealing surface between the opposite ends which is not covered by the overmold housing member, wherein the exterior sealing surface loops around the housing sub-assembly, and wherein the exterior sealing surface comprises a smooth surface without mold parting lines between the pre-mold housing member and the overmold housing member.

2. A device as in claim 1 wherein the electrical contact comprises a first end, an opposite second end and a bent section between the first and second ends, wherein the first end comprises a female connection area, and wherein the overmold housing member is overmolded onto the bent section.

3. A device as in claim 2 wherein the pre-mold housing member is overmolded onto the female connection areas as separate tubes.

4. A device as in claim 3 wherein the overmold housing member comprises a tube section which is spaced from and surrounds the separate tubes.

5. A device as in claim 1 wherein the opposite ends comprise a first end on the electrical contacts and a second end covered by the overmold housing member, and wherein a middle section of the pre-mold housing member forms the exterior sealing surface.

6. A device as in claim 5 wherein the middle section comprises an outwardly projecting annular flange.

7. A device as in claim 6 wherein the overmold housing member forms an outward extending ledge facing the exterior sealing surface such that the exterior sealing surface is located in a recess between the ledge and the flange.

8. A device as in claim 1 wherein the overmold housing member comprises a middle section entirely contained within the pre-mold housing member between the opposite ends.

9. A device as in claim 8 wherein the pre-mold housing member comprises interior holes which are only open to the opposite ends of the pre-mold housing member, and wherein the middle section of the overmold housing member is located in the holes.

10. A device as in claim 1 wherein the device comprises a fuel pump assembly comprising:
    a fuel pump;
    a can member connected to the fuel pump and having a front end of the housing subassembly extending through the can member into connection with the fuel pump; and an O-ring seal directly compressed between the exterior sealing surface of the pre-mold housing member and the can member.

11. A fuel pump assembly as in claim 10 wherein the can member comprises an end with a flange adapted to mate with a flange of the exterior sealing surface of the pre-mold housing member.

12. A fuel system electrical connector comprising:
at least one electrical contact having a first end and an opposite second end; and
a housing connected to the electrical contact, wherein the housing comprises:
  a one-piece pre-mold housing member which has been overmolded onto the electrical contact; and
  a one-piece overmold housing member which has been overmolded onto the pre-mold housing member, wherein the overmold housing member is located at a front end and a rear end of the pre-mold housing member,
  wherein the pre-mold housing member comprises an exterior sealing surface which is not covered by the overmold housing member, wherein the exterior sealing surface of the pre-mold housing member loops around an outer lateral side of the housing, and wherein areas of contact between the overmold housing member, the electrical contacts and the pre-mold housing member form tortuous paths to prevent flow of fuel vapor along the paths through the connector.

13. A fuel system electrical connector as in claim 12 wherein the overmold housing member comprises a tube section which is spaced from and surrounds separate tubes of the pre-mold housing member.

14. A fuel system electrical connector as in claim 12 wherein the pre-mold housing member has been insert molded onto the electrical contact such that the exterior sealing surface of the pre-mold housing member comprises a smooth surface without mold parting lines.

15. A fuel system electrical connector as in claim 12 wherein the first end of the pre-mold housing member is on the electrical contacts, the second end is covered by the overmold housing member, and a middle section forms the exterior sealing surface.

16. A fuel system electrical connector as in claim 15 wherein the middle section comprises an outwardly projecting annular flange.

17. A fuel system electrical connector as in claim 16 wherein the overmold housing member forms an outward extending ledge facing the exterior sealing surface such that the exterior sealing surface is located in a recess between the ledge and the flange.

18. A fuel system electrical connector as in claim 12 wherein the overmold housing member comprises a middle section entirely contained within the pre-mold housing member between the front and rear ends of the pre-mold housing member.

19. A fuel system electrical connector as in claim 18 wherein the pre-mold housing member comprises interior holes which are only open to the front and rear ends of the pre-mold housing member, and wherein the middle section of the overmold housing member is located in the holes.

20. An electrical connector comprising:
at least one electrical contact; and
a housing comprising:
  a one-piece pre-mold housing member which has been overmolded onto the electrical contact; and
  a one-piece overmold housing member which has been overmolded onto the pre-mold housing member, wherein the overmold housing member is located on opposite ends of the pre-mold housing member and extends though an internal passageway through the pre-mold housing member,
  wherein the pre-mold housing member comprises a sealing surface at an exterior of the pre-mold housing member between the opposite ends which is not covered by the overmold housing member and without mold parting lines between the pre-mold housing member and the overmold housing member.

21. An electrical connector comprising:
at least one electrical contact; and
a housing subassembly comprising:
  a one-piece first housing which has been overmolded onto the electrical contact; and
  a second housing which has been overmolded onto the first housing and onto the electrical contact,
  wherein the first housing comprises a sealing surface configured to have a seal form a sealing engagement thereagainst, wherein the sealing surface is not covered by the second housing and loops around an exterior side of the first housing,
  wherein the second housing has portions located on the first housing past opposite ends of the sealing surface such that the sealing surface does not comprise mold parting lines between the pre-mold housing and the overmold housing.

* * * * *